(12) United States Patent
Pimentel

(10) Patent No.: US 9,013,293 B2
(45) Date of Patent: Apr. 21, 2015

(54) APPARATUS AND METHOD FOR SYNCHRONIZING COLOR, BLINKING, AND/OR BLINKING RATE OF A FIRST LIGHT OF A FIRST DEVICE WITH A SECOND LIGHT OF A SECOND DEVICE

(71) Applicant: Miguel R. Pimentel, Holbrook, MA (US)

(72) Inventor: Miguel R. Pimentel, Holbrook, MA (US)

(73) Assignee: Miguel R. Pimentel, Holbrook, MA (US)

( * ) Notice: Subject to any disclaimer, the term of this patent is extended or adjusted under 35 U.S.C. 154(b) by 141 days.

(21) Appl. No.: 13/938,211

(22) Filed: Jul. 9, 2013

(65) Prior Publication Data
US 2015/0015391 A1     Jan. 15, 2015

(51) Int. Cl.
*B60Q 1/00*     (2006.01)
*B60Q 1/34*     (2006.01)
*G09F 13/22*    (2006.01)
*G06F 1/16*     (2006.01)
*G06F 19/00*    (2011.01)
*B60Q 1/52*     (2006.01)
*G09F 27/00*    (2006.01)

(52) U.S. Cl.
CPC .............. *B60Q 1/0017* (2013.01); *B60Q 1/346* (2013.01); *G09F 13/22* (2013.01); *B60Q 1/34* (2013.01); *G06F 1/1698* (2013.01); *G06F 19/00* (2013.01); *B60Q 1/52* (2013.01); *G09F 27/00* (2013.01); *B60Q 2900/30* (2013.01)

(58) Field of Classification Search
None
See application file for complete search history.

(56) References Cited

U.S. PATENT DOCUMENTS

| | | | | |
|---|---|---|---|---|
| 7,564,426 B2* | 7/2009 | Poor et al. | | 345/48 |
| 2002/0070849 A1* | 6/2002 | Teicher et al. | | 340/425.5 |
| 2008/0238649 A1* | 10/2008 | Arszman et al. | | 340/471 |
| 2012/0212320 A1* | 8/2012 | Oberholtzer | | 340/3.2 |
| 2013/0154821 A1* | 6/2013 | Miller et al. | | 340/471 |

* cited by examiner

*Primary Examiner* — Daniell L Negron
*Assistant Examiner* — John Bamert

(57) ABSTRACT

A first device is configured to emit light and synchronize both or either color and/or rate of blinking of a first light of the first device with a second light of a second device. The synchronizing enables observing an implied relationship and/or connection between the first device and the second device.

20 Claims, 10 Drawing Sheets

Attach, to an object, a housing containing (A) a first light of a first device or (B) the first device, wherein the attaching is (A) in a blinker relay location of a vehicle, (B) on a top of the vehicle (a) magnetically, (b) by suction, or (c) with a flange, or (C) on a side of the vehicle (a) magnetically, (b) by suction, or (c) with the flange With the first device, accepting a timing signal, wherein the timing signal is from a source external to (A) the first device and (B) a second device With the first device, accepting an interchangeable placement of the first device into a slave mode or a master mode Based on a first signal sent to or received from the second device, synchronizing (A) a color of the first light with a second light of the second device, (B) blinking of the first light with the second light, and/or (C) a rate of blinking of the first light with the second light Either (A) selecting, based on a switch input, (a) the color, (b) a blinking rate, or (c) the slave mode or the master mode or (B) selecting, based on a dial input, the slave mode or the master mode

FIG. 11

With a first device, accepting a timing signal, wherein the timing signal is from a source external to (A) the first device and (B) a second device With the first device, accepting an interchangeable placement of the first device into a slave mode or a master mode Based on a first signal sent to or received from the second device, synchronizing (A) a color of a first light of the first device with a second light of the second device, (B) blinking of the first light with the second light, and/or (C) a rate of blinking of the first light with the second light Either (A) selecting, based on a switch input, (a) the color, (b) a blinking rate, or (c) the slave mode or the master mode or (B) selecting, based on a dial input, the slave mode or the master mode

FIG. 12

Attach, to an object, a housing containing (A) a first light of a first device or (B) the first device, wherein the attaching is (A) in a blinker relay location of a vehicle, (B) on a top of the vehicle (a) magnetically, (b) by suction, or (c) with a flange, or (C) on a side of the vehicle (a) magnetically, (b) by suction, or (c) with the flange With the first device, accepting an interchangeable placement of the first device into a slave mode or a master mode Based on a first signal sent to or received from the second device, synchronizing (A) a color of the first light with a second light of the second device, (B) blinking of the first light with the second light, and/or (C) a rate of blinking of the first light with the second light Either (A) selecting, based on a switch input, (a) the color, (b) a blinking rate, or (c) the slave mode or the master mode or (B) selecting, based on a dial input, the slave mode or the master mode

FIG. 13

Attach, to an object, a housing containing (A) a first light of a first device or (B) the first device, wherein the attaching is (A) in a blinker relay location of a vehicle, (B) on a top of the vehicle (a) magnetically, (b) by suction, or (c) with a flange, or (C) on a side of the vehicle (a) magnetically, (b) by suction, or (c) with the flange With the first device, accepting a timing signal, wherein the timing signal is from a source external to (A) the first device and (B) a second device Based on a first signal sent to or received from the second device, synchronizing (A) a color of the first light with a second light of the second device, (B) blinking of the first light with the second light, and/or (C) a rate of blinking of the first light with the second light Either (A) selecting, based on a switch input, (a) the color, (b) a blinking rate, or (c) a slave mode or a master mode or (B) selecting, based on a dial input, the slave mode or the master mode

FIG. 14

APPARATUS AND METHOD FOR SYNCHRONIZING COLOR, BLINKING, AND/OR BLINKING RATE OF A FIRST LIGHT OF A FIRST DEVICE WITH A SECOND LIGHT OF A SECOND DEVICE

BACKGROUND

As a teenager, I remember going to amusement parks with my friends in several cars and trying all get there without getting separated was always a challenge. Especially when one of us got caught at a red light or when we lost sight of one another because of too much traffic and other cars cutting in between us. I always wished of having a way to visually link our vehicles so that other drivers would realize we were traveling together.

We tried turning our hazard light on, but this was confusing and not obvious to other drivers. Many people have different notions of what it means when you have your hazard lights on. After all, they are called "hazard lights" for a reason.

My inspiration for creating a device that could visually link vehicles together came to me after observing a massive electric arc at a show in the Museum of Science in Boston, Mass. I left the presentation thinking, "Wouldn't it be nice if I could have an electric arc-like effect going from one car to another? And, that way make it clear to other drivers that the cars are traveling together and in turn receive the courtesy of having the spaces in between respected."

I have also seen myself cutting through the middle of a funeral procession by mistake, because of not noticing the markings on the cars in the procession. Another encounter with this problem I am trying to solve with this invention was a few years ago when my wife and I were looking into buying a new home. It was challenging and at some points even dangerous to follow our realtor on the way to see properties she was taking us to see. It was dangerous because, with the extra distraction to try to not lose track of her vehicle or avoiding other vehicles from cutting in between us, you could become distracted enough to the point to be dangerous driving. And, it is just common practice to follow a realtor on the way to see the different properties. We did just that, as we used to meet our realtor at our first viewing and then follow her to the following properties.

SUMMARY

A method is performed. The method includes performing at least two of steps (I)-(III). Step (I) comprises attaching, (A) in a blinker relay location of a vehicle, (B) on a top of the vehicle (a) magnetically, (b) by suction, or (c) with a flange, or (C) on a side of the vehicle (a) magnetically, (b) by suction, or (c) with the flange, a housing containing (A) a first light of a first device or (B) the first device. Step (II) comprises accepting, with the first device, a timing signal from a source external to (A) the first device and (B) a second device. Step (III) comprises accepting, with the first device, interchangeable placement of the first device into a slave mode or a master mode. The method additionally includes synchronizing, based on a first signal sent to or received from the second device, (A) a color of the first light with a second light of the second device or (B) blinking of the first light with the second light.

An apparatus comprises a first light. The apparatus additionally comprises at least one of devices (I)-(III). Device (I) is a first device. The first device includes a first controller configured to synchronize, based on (A) a first signal sent or received to or from a second device and (B) a timing signal from a source external to (a) the apparatus and (b) the second device, (A) a color of the first light with a second light of the second device or (B) blinking of the first light with the second light. The first device additionally includes a first housing (A) containing the first light or the first controller and (B) configured to attach to a vehicle (a) in a blinker relay location of the vehicle, (b) on a top of the vehicle (i) magnetically, (ii) by suction, or (iii) with a flange, or (c) on a side of the vehicle (i) magnetically, (ii) by suction, or (iii) with the flange. Device (II) is a second device. The second device includes a second controller configured to synchronize, based on the first signal after accepting, with the apparatus, interchangeable placement of the apparatus into a slave mode or a master mode, (A) the color with the second light or (B) the blinking with the second light. The second device additionally includes a second housing (A) containing the first light or the second controller and (B) configured to attach to the vehicle (a) in the blinker relay location, (b) on the top (i) magnetically, (ii) by suction, or (iii) with the flange, or (c) on the side (i) magnetically, (ii) by suction, or (iii) with the flange. Device (III) is a third device. The third device includes a third controller configured to synchronize, after accepting, with the apparatus, the interchangeable placement, based on (A) the first signal and (B) a timing signal from a source external to (a) the third controller and (b) the second device, (A) the color with the second light or (B) the blinking with the second light.

BRIEF DESCRIPTION OF THE DRAWINGS

Reference to the detailed description is taken in connection with the following illustrations:

FIG. 11 illustrates a method of making and/or using the apparatus and/or a method of operation for the apparatus;

FIG. 12 illustrates a method of making and/or using the apparatus and/or a method of operation for the apparatus;

FIG. 13 illustrates a method of making and/or using the apparatus and/or a method of operation for the apparatus; and FIG. 14 illustrates a method of making and/or using the apparatus and/or a method of operation for the apparatus.

DETAILED DESCRIPTION

Figure 1:
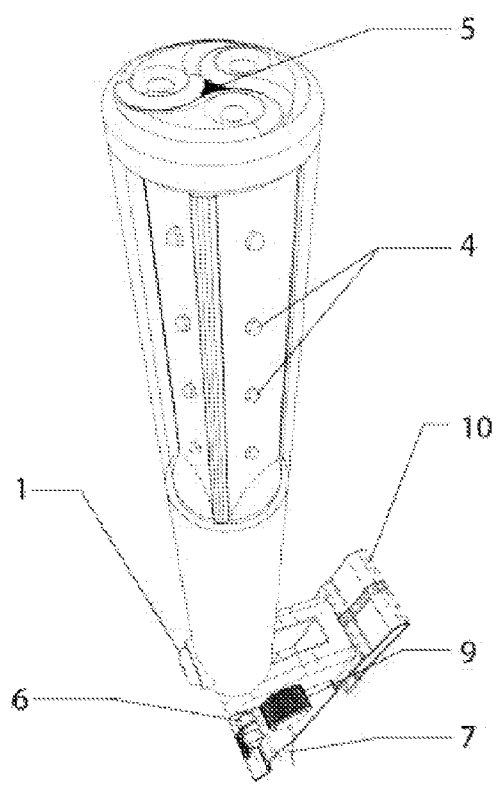
FIG. 1 is a perspective view providing a top view of an apparatus.
Figure 2:
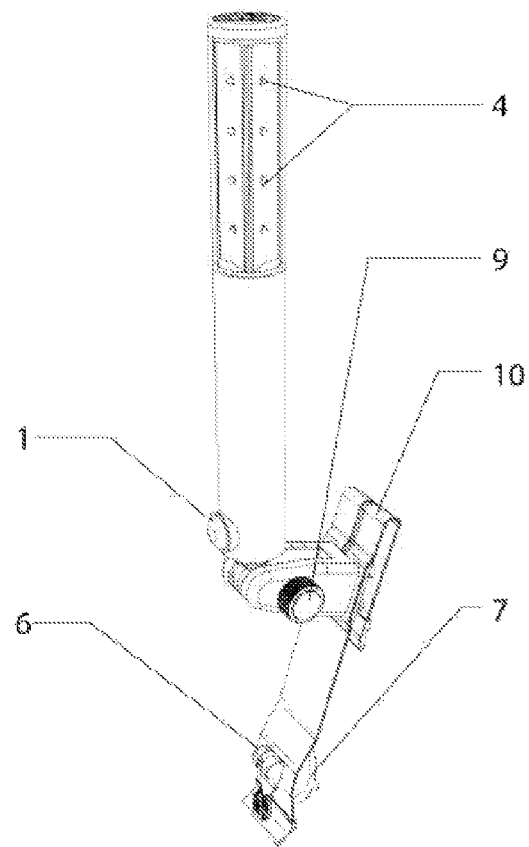
FIG. 2 is a perspective view providing a right side view of the apparatus.
Figure 3:
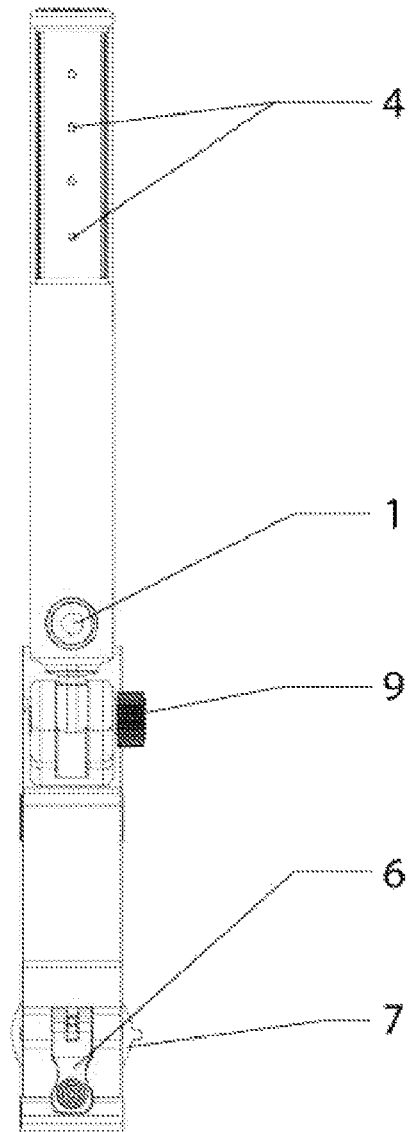
FIG. 3 is a front elevation view of the apparatus.
Figure 4:
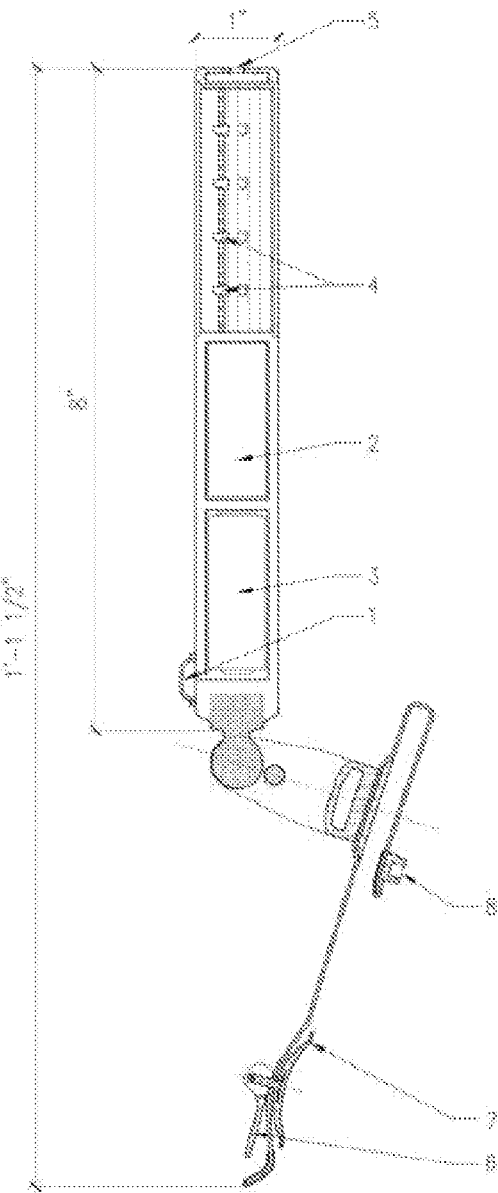
FIG. 4 is a right side cross section of the apparatus.
Figure 5:
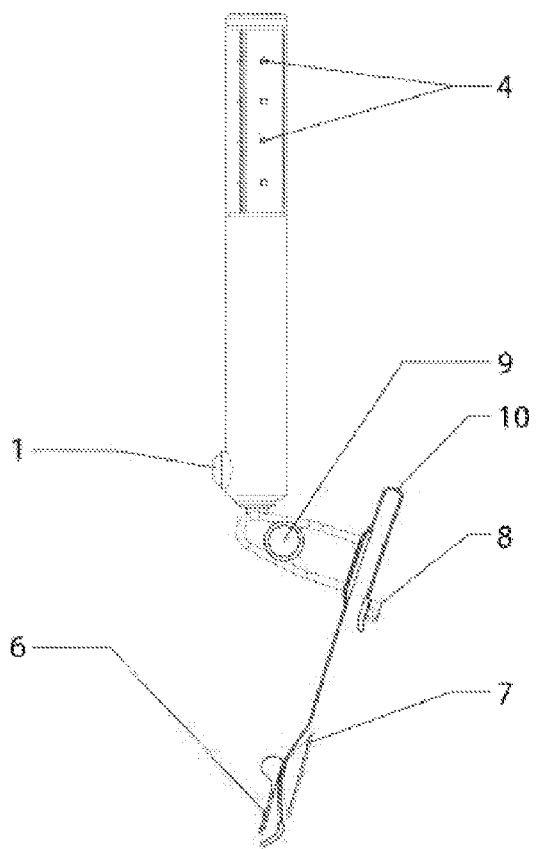
FIG. 5 is a right side elevation view of the apparatus.
Figure 6:
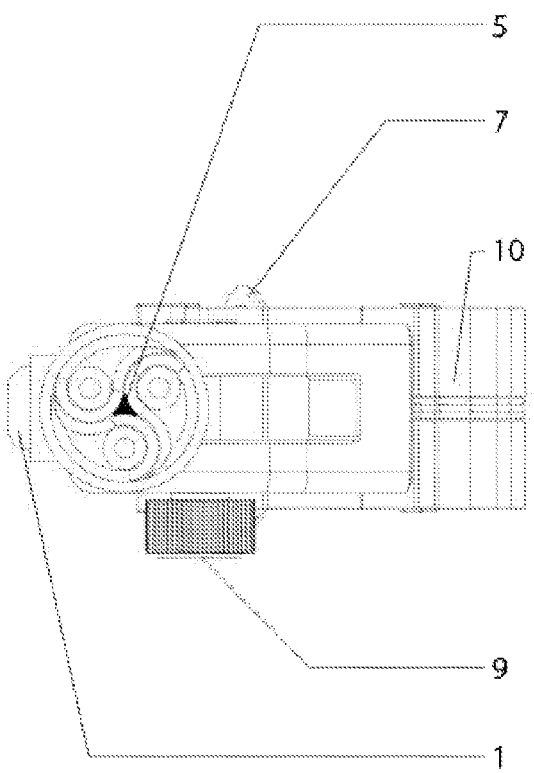
FIG. 6 is a plan view providing a top view of the apparatus.
Figure 7:
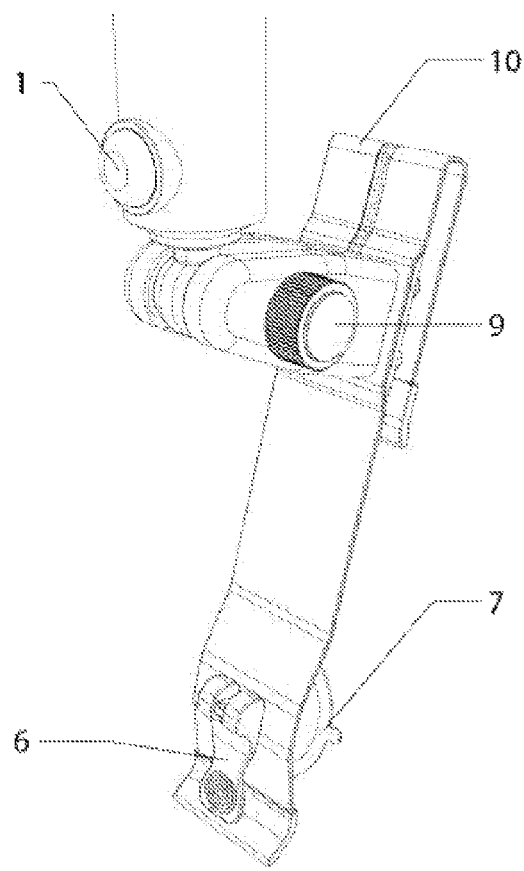
FIG. 7 is a detail perspective view of the apparatus.
Figure 8:
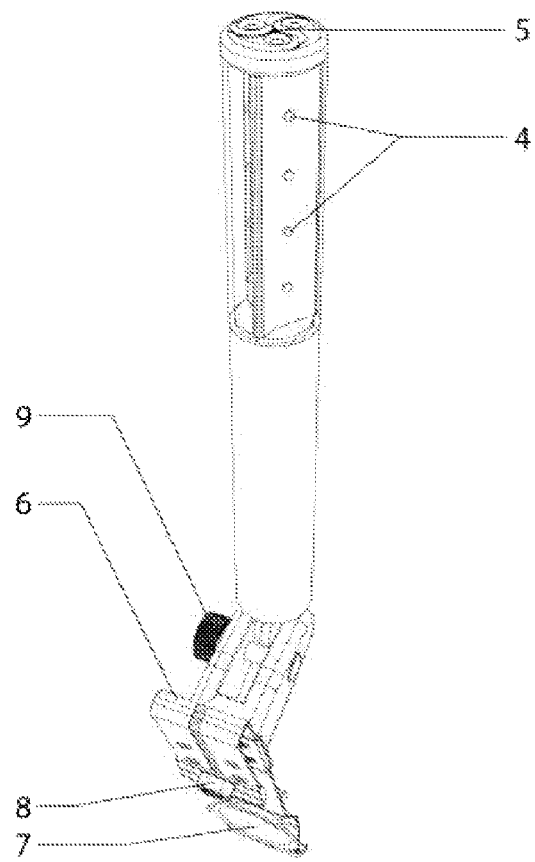
FIG. 8 is a perspective view providing a rear view of the apparatus.
Figure 9:
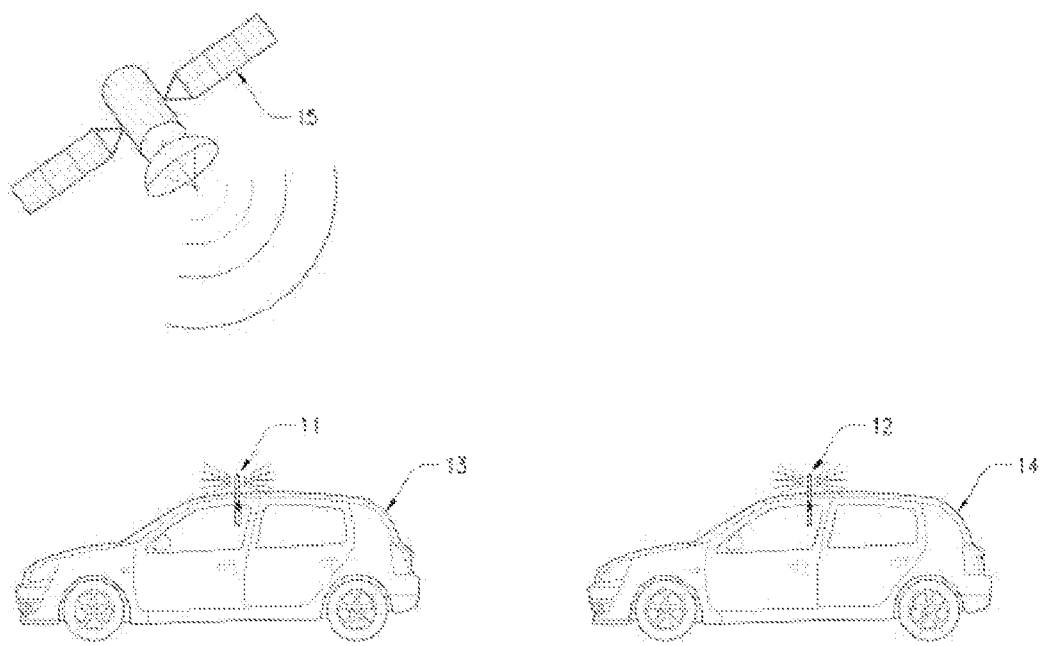
FIG. 9 illustrates a first vehicle and a second vehicle to one of which the apparatus is attached and the other of which a second device is attached.
Figure 10:
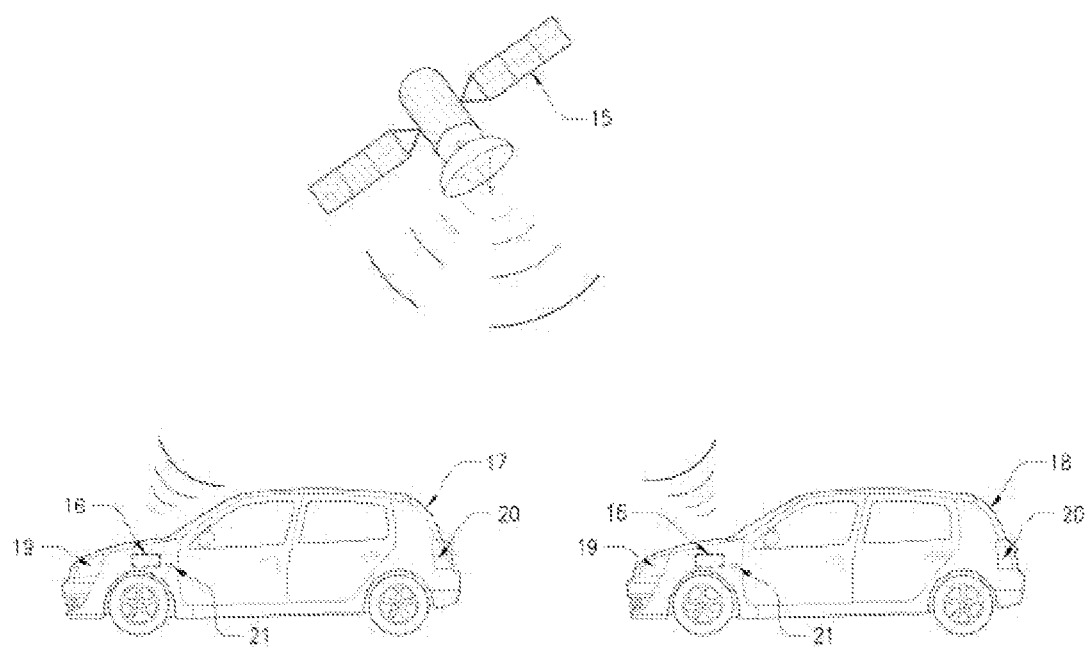
FIG. 10 illustrates a third vehicle and a fourth vehicle to one of which the apparatus is attached and the other of which the second device is attached.

An apparatus comprises a first light. The apparatus additionally comprises a controller 2. The apparatus may additionally comprise a housing. The apparatus may additionally comprise a switch/dial/toggle 1 that serves as a power interrupter and additionally or alternatively an input for adjusting light color, blinking, and/or blinking rate.

The controller 2 is configured to synchronize the first light with a second light of a second device. The controller 2 is configured to synchronize a color of the first light with the second light. Additionally or alternatively, the controller 2 is configured to synchronize blinking of the first light with the second light. Additionally or alternatively, the controller 2 is configured to synchronize a rate of blinking of the first light with the second light. The controller 2 is configured to synchronize the first light with the second light based on a first signal sent to or received from the second device. The first signal may be a radio signal. The first signal may contain information pertaining to the color, blinking, and/or rate of blinking.

For example, the apparatus may be attached to a first vehicle 13 or a second vehicle 14 while the second device is attached to the other of the first vehicle 13 or the second vehicle 14. Alternatively or additionally, the second device may be attached to a third vehicle 17, or a fourth vehicle 18. In either case, the apparatus in this example is respectively either device 11 or device 12.

As an additional example, the apparatus may be attached to the third vehicle 17 or the fourth vehicle 18 while the second device is attached to the other of the third vehicle 17 or the fourth vehicle 18. Alternatively or additionally, the second device may be attached to the first vehicle 13, or the second vehicle 14. In either case, the apparatus in this example is located in a blinker relay location 16 of either the third vehicle 17 or the fourth vehicle 18 to which the apparatus is attached.

In both examples, the apparatus synchronizes the first light with the second light based on the first signal sent to or received from the second device.

The controller 2 may be configured to synchronize the first light with the second light based on (A) the first signal and (B) a timing signal from a source external to both (a) the apparatus and (b) the second device. The timing signal may be a radio signal. The timing signal may be a Global Positioning System (GPS) signal from a satellite such as satellite 15. The timing signal may be received via a GPS receiver included in or with the apparatus. The GPS receiver may be configured to globally control the rate of blinking. The controller 2 may be configured to synchronize the first light with the second light by controlling the color, blinking, and/or rate of blinking relative to the timing signal based on the information contained in the first signal.

For example, the device 11, the device 12, the device in the blinker relay location 16 of the third vehicle 17, and/or the device in the blinker relay location 16 of the fourth vehicle may receive the timing signal from GPS satellite 15 and send the first signal to or received the first signal from another of the device 11, the device 12, the device in the blinker relay location 16 of the third vehicle 17, and/or the device in the blinker relay location 16 of the fourth vehicle.

The apparatus may be configured to operate in a slave mode. Alternatively, the apparatus may be configured to operate in a master mode. Alternatively, the apparatus may be configured to be interchangeably placed into the slave mode or the master mode. The apparatus may be configured to accept interchangeable placement into the slave mode or the master mode. If the apparatus is configured to accept interchangeable placement into the slave mode or the master mode, then the interchangeable placement may be provided to the apparatus via the switch/dial/toggle 1.

If the apparatus operates in the slave mode, the controller 2 is configured to synchronize the first light with the second light based at least on the first signal received from the second device. If the apparatus operates in the master mode, the controller 2 is configured to synchronize the first light with the second light based at least on the first signal sent to the second device.

For example, at least one of the device 11, the device 12, the device in the blinker relay location 16 of the third vehicle 17, and/or the device in the blinker relay location 16 of the fourth vehicle may operate in the master mode while at least one of the device 11, the device 12, the device in the blinker relay location 16 of the third vehicle 17, and/or the device in the blinker relay location 16 of the fourth vehicle may operate in the slave mode. The at least one device operating in the master mode sends the first signal to the at least one device operating in the slave mode. The at least one device operating in the slave mode receives the first signal from the at least one device operating in the master mode. The at least one device operating in the master mode synchronizes the first light with the second light based on the first signal. The at least one device operating in the slave mode synchronizes the first light with the second light based on the first signal.

The housing may contain both or either of the first light and/or the controller 2. The housing may additionally contain both or either of batteries 3 and electronics including the GPS receiver. The housing may be configured to attach to an object such as a vehicle, e.g. first vehicle 13, second vehicle 14, third vehicle 17, and/or fourth vehicle 18. The housing may be configured to attach to the vehicle in a blinker relay location 16 of the vehicle. The housing may be configured to attach to the vehicle on a top of the vehicle. The housing may be configured to attach to the vehicle on a side of the vehicle.

If the housing is configured to attach to the vehicle in the blinker relay location 16, then the housing may be shaped like a blinker relay. If the housing is configured to attach to the vehicle in the blinker relay location 16, then the controller 2 may be a programmable blinker relay.

If the housing is configured to attach to both or either of the top and/or side of the vehicle as shown by apparatuses 11 and 12, then the housing may be configured to attach to the top and/or side magnetically, by suction, and/or with a flange 10. The flange 10 may be metal. The flange 10 may curve over a rolling glass window. Suction may be achieved by a suction cup 7. The suction cup may be manipulated with a locking lever 6. The housing may be shaped as an antenna, a dome, or a cylinder.

The first light may be arranged such that light emitted from the first light is visible from 360° on a ground plane. For example, the first light may comprise at least one of lights 4. Additionally or alternatively, the first light may comprise at least one of lights 19. The first light may additionally or alternatively comprise at least one of lights 20. The first light may additionally or alternatively comprise at least one of lights 21. Lights 19, 20, 21 may be hazard lights. Lights 19, 20, 21 may additionally or alternatively be any lights attached to the vehicle.

The apparatus may additionally comprise a photo sensitive sensor 5 that controls intensity of the first light. The apparatus may additionally comprise a power connector 8. The apparatus may additionally comprise a position adjustment knob 9.

The technology and ability of the apparatus can be retrofitted to old and new vehicles by means of replacing the blinker relay for the programmable relay of the apparatus. The programmable relay of the apparatus is a device that is a direct replacement for the relay in cars that control the blinkers. The programmable relay of the apparatus has the ability to synchronize the rate of blinking of hazard lights in between vehicles using programmable relays of the apparatus.

The apparatus is to be placed on objects such as vehicles traveling in a parade/procession to indicate a relationship between the vehicles and caution other vehicles outside of the group. Objects such as vehicles may be visually linked with the apparatus by having the same color light and synchronized rate of blinking indicating to others that the vehicles are traveling together. This will indicate to others that the space in between two or more vehicles using the apparatus is to be respected and not to cut them off. A good use for this device is in funeral processions. Another use for this is the case of realtors that travel in their vehicles followed by customers to see a property.

This will alert other drivers and pedestrians the implied relationship and connection in between the vehicles.

For example, the apparatus may be used on two or more vehicles at a time to indicate to others that the vehicles using the apparatus are traveling together on a parade. The apparatus is able to synchronize both the color and rate of blinking of the light emitted by the master with other devices acting as slaves. The apparatus acting as a master will emit a signal that can be picked up by devices running as slaves. The signal will contain information pertaining to the color of the light and the relative rate of blinking from the GPS receiver and accurate real time data for synchronization purposes.

When one object such as a vehicle follows another one or a few objects such as vehicles are traveling in a parade/procession the objects can be linked by the use of the apparatus placed on each object. The device will indicate to other drivers and pedestrians by means of having synchronized light color and blinking rate that the objects are traveling together. This will indicate to them that the space in between the objects is to be respected and not to cut them off, like in the case of a funeral procession using purple light(s) as the color of the first light. Another good use for this is the case of realtors that travel in their vehicles followed by customers on the way to see a property.

I claim:

1. A method comprising:
   performing two of steps (I)-(III):
   (I) attaching, (A) in a blinker relay location of a vehicle, (B) on a top of the vehicle (a) magnetically, (b) by suction, or (c) with a flange, or (C) on a side of the vehicle (a) magnetically, (b) by suction, or (c) with the flange, a housing containing (A) a first light of a first device or (B) the first device;
   (II) accepting, with the first device, a timing signal from a source external to (A) the first device and (B) a second device; and
   (III) accepting, with the first device, interchangeable placement of the first device into a slave mode or a master mode; and
   synchronizing, based on a first signal sent to or received from the second device, (A) a color of the first light with a second light of the second device or (B) blinking of the first light with the second light.

2. The method of claim 1, (A) wherein the housing is shaped as (a) a blinker relay, (b) an antenna, (c) a dome, or (d) a cylinder or (B) further comprising:
   attaching the housing by at least two of (a) magnetically, (b) by suction, and (c) with the flange.

3. The method of claim 1, wherein the housing is configured such that light emitting from the housing is visible from 360° on a ground plane.

4. The method of claim 1, wherein the first signal is a radio signal.

5. The method of claim 1, wherein the first signal contains information pertaining to (A) the color or (B) the blinking.

6. The method of claim 1, further comprising:
   synchronizing (A) the color with the second light and (B) the blinking with the second light.

7. The method of claim 1, further comprising:
   synchronizing a rate of blinking of the first light with the second light.

8. The method of claim 7, wherein the rate of blinking is from a Global Positioning System (GPS) receiver.

9. The method of claim 1, further comprising:
   (A) selecting, based on a switch input, (a) the color, (b) a blinking rate, or (c) the slave mode or the master mode; or
   (B) selecting, based on a dial input, the slave mode or the master mode.

10. An apparatus comprising:
    a first light; and
    one of devices (I)-(III):
    (I) a first device including:
       a first controller configured to synchronize, based on (A) a first signal sent or received to or from a second device and (B) a timing signal from a source external to (a) the apparatus and (b) the second device, (A) a color of the first light with a second light of the second device or (B) blinking of the first light with the second light; and
       a first housing (A) containing the first light or the first controller and (B) configured to attach to a vehicle (a) in a blinker relay location of the vehicle, (b) on a top of the vehicle (i) magnetically, (ii) by suction, or (iii) with a flange, or (c) on a side of the vehicle (i) magnetically, (ii) by suction, or (iii) with the flange;
    (II) a second device including:
       a second controller configured to synchronize, based on the first signal after accepting, with the apparatus, interchangeable placement of the apparatus into a slave mode or a master mode, (A) the color with the second light or (B) the blinking with the second light; and
       a second housing (A) containing the first light or the second controller and (B) configured to attach to the vehicle (a) in the blinker relay location, (b) on the top (i) magnetically, (ii) by suction, or (iii) with the flange, or (c) on the side (i) magnetically, (ii) by suction, or (iii) with the flange; and
    (III) a third device including:
       a third controller configured to synchronize, after accepting, with the apparatus, the interchangeable placement, based on (A) the first signal and (B) a timing signal from a source external to (a) the third controller and (b) the second device, (A) the color with the second light or (B) the blinking with the second light.

11. The apparatus of claim 10, wherein (A) the first or second housing is shaped as (a) a blinker relay, (b) an antenna, (c) a dome, or (d) a cylinder or (B) the first or second housing is configured to attach by at least two of (a) magnetically, (b) by suction, and (c) with the flange.

12. The apparatus of claim 10, wherein light emitting from the first or second housing is visible from 360° on a ground plane.

13. The apparatus of claim 10, wherein the first signal is a radio signal.

14. The apparatus of claim 10, wherein the first signal contains information pertaining to (A) the color or (B) the blinking.

15. The apparatus of claim 10, wherein the first, second, or third controller is configured to synchronize (A) the color with the second light and (B) the blinking with the second light.

16. The apparatus of claim 10, wherein the first, second, or third controller is configured to synchronize the blinking by synchronizing a rate of blinking of the first light with the second light.

17. The apparatus of claim 16, wherein the rate of blinking is from a Global Positioning System (GPS) receiver.

18. The apparatus of claim 10, further comprising:
a Global Positioning System (GPS) receiver.

19. The apparatus of claim 10, further comprising:
(A) a switch to (a) set the color, (b) set a blinking rate, or (c) interchangeably select the slave mode or the master mode or (B) a dial to interchangeably select the slave mode or the master mode.

20. The apparatus of claim 10, further comprising:
a photo sensitive sensor arranged such that measurements from the sensor are a basis for controlling intensity of the first light.

* * * * *